(12) United States Patent
Beale

(10) Patent No.: US 11,129,153 B2
(45) Date of Patent: *Sep. 21, 2021

(54) TELECOMMUNICATIONS SYSTEMS AND METHODS FOR MACHINE TYPE COMMUNICATION

(71) Applicant: SCA IPLA HOLDINGS INC., New York, NY (US)

(72) Inventor: Martin Beale, Bristol (GB)

(73) Assignee: SCA IPLA HOLDINGS INC., New York, NY (US)

( * ) Notice: Subject to any disclaimer, the term of this patent is extended or adjusted under 35 U.S.C. 154(b) by 231 days.

This patent is subject to a terminal disclaimer.

(21) Appl. No.: 16/221,609

(22) Filed: Dec. 17, 2018

(65) Prior Publication Data

US 2019/0141683 A1    May 9, 2019

Related U.S. Application Data

(60) Continuation of application No. 15/869,415, filed on Jan. 12, 2018, now Pat. No. 10,178,662, which is a
(Continued)

(30) Foreign Application Priority Data

Dec. 19, 2011    (GB) ...................................... 1121767

(51) Int. Cl.
*H04W 72/04*    (2009.01)
*H04L 5/00*    (2006.01)
(Continued)

(52) U.S. Cl.
CPC ......... *H04W 72/042* (2013.01); *H04L 5/0044* (2013.01); *H04L 5/0053* (2013.01);
(Continued)

(58) Field of Classification Search
None
See application file for complete search history.

(56) References Cited

U.S. PATENT DOCUMENTS 8,233,444 B2    7/2012    Cordeiro et al.
9,137,805 B2    9/2015    Cordeiro et al.
(Continued)

FOREIGN PATENT DOCUMENTS

| CN | 101005345 A | 7/2007 |
|---|---|---|
| CN | 101369972 A | 2/2009 |

(Continued)

OTHER PUBLICATIONS

Office Action issued in corresponding Japanese Application No. 2017-006368 dated Apr. 17, 2018 (with summarized English translation).

(Continued)

*Primary Examiner* — Xavier S Wong
(74) *Attorney, Agent, or Firm* — Xsensus LLP

(57) ABSTRACT

A method for communicating data between a base station and a terminal device in a wireless telecommunications system, for example an LTE-based system. The wireless communication system uses plural frequency sub-carriers spanning a system frequency band. Physical-layer control information for the terminal device is transmitted from the base station using sub-carriers selected from across the system frequency band, for example to provide frequency diversity. However, higher-layer data for the terminal device is transmitted using only sub-carriers selected from within a restricted frequency band which is smaller than and within the system frequency band. The terminal device is aware of the restricted frequency band, and as such need only buffer and process data within this restricted frequency band during periods where higher-layer data is being transmitted. The terminal device buffers and processes the full system fre-
(Continued)

quency band during periods when physical-layer control information is transmitted.

29 Claims, 8 Drawing Sheets

Related U.S. Application Data continuation of application No. 15/408,463, filed on Jan. 18, 2017, now Pat. No. 9,949,253, which is a division of application No. 14/357,832, filed as application No. PCT/GB2012/053157 on Dec. 17, 2012, now Pat. No. 9,572,147.

(51) Int. Cl.
  *H04W 4/70* (2018.01)
  *H04L 12/861* (2013.01)
  *H04W 4/80* (2018.01)

(52) U.S. Cl.
  CPC ........... *H04L 49/9094* (2013.01); *H04W 4/70* (2018.02); *H04W 4/80* (2018.02); *H04W 72/0446* (2013.01)

(56) References Cited

U.S. PATENT DOCUMENTS

| | | | |
|---|---|---|---|
| 9,516,450 B2* | 12/2016 | Beale | H04W 72/042 |
| 9,572,147 B2 | 2/2017 | Beale | |
| 9,930,658 B2* | 3/2018 | Beale | H04W 72/042 |
| 9,949,253 B2* | 4/2018 | Beale | H04L 49/9094 |
| 10,178,662 B2* | 1/2019 | Beale | H04W 4/80 |
| 10,555,293 B2* | 2/2020 | Beale | H04L 5/0064 |
| 2003/0026293 A1 | 2/2003 | Raissinia et al. | |
| 2010/0020732 A1* | 1/2010 | Gaddam | H04H 20/72 370/310 |
| 2011/0069637 A1 | 3/2011 | Liu et al. | |
| 2011/0170515 A1 | 7/2011 | Kim | |
| 2011/0268046 A1 | 11/2011 | Choi et al. | |
| 2012/0076043 A1 | 3/2012 | Nishio et al. | |
| 2012/0113884 A1 | 5/2012 | Park et al. | |
| 2012/0113889 A1 | 5/2012 | Noh et al. | |
| 2012/0134328 A1* | 5/2012 | Gauvreau | H04L 5/0037 370/329 |
| 2012/0327894 A1 | 12/2012 | Axmon et al. | |
| 2013/0010741 A1 | 1/2013 | Dai et al. | |
| 2013/0016649 A1 | 1/2013 | Damnjanovic et al. | |
| 2013/0176995 A1 | 7/2013 | Park et al. | |
| 2013/0322238 A1* | 12/2013 | Sirotkin | H04W 28/08 370/230 |
| 2013/0343315 A1* | 12/2013 | Tiirola | H04W 72/082 370/329 |
| 2014/0105164 A1* | 4/2014 | Moulsley | H04W 72/1289 370/329 |
| 2014/0112277 A1 | 4/2014 | Yang et al. | |
| 2014/0204854 A1 | 7/2014 | Freda et al. | |
| 2014/0254537 A1 | 9/2014 | Kim et al. | |
| 2014/0348094 A1* | 11/2014 | Charbit | H04W 56/001 370/329 |
| 2015/0163771 A1 | 6/2015 | Kim et al. | |

FOREIGN PATENT DOCUMENTS

| | | | |
|---|---|---|---|
| CN | 101562880 A | 10/2009 | |
| EP | 2 372 927 A2 | 10/2011 | |
| EP | 2372927 A2 | 10/2011 | |
| GB | 2487757 A | 8/2012 | |
| GB | 2487780 A | 8/2012 | |
| GB | 2487782 A | 8/2012 | |
| GB | 2487906 A | 8/2012 | |
| GB | 2487907 A | 8/2012 | |
| GB | 2487908 A | 8/2012 | |
| GB | 2487909 A | 8/2012 | |
| GB | 2488513 A | 9/2012 | |
| RU | 2264036 C2 | 11/2005 | |
| WO | 2010/039003 A2 | 4/2010 | |
| WO | 2010/043183 A1 | 4/2010 | |
| WO | 2011/008057 A2 | 1/2011 | |
| WO | 2012/005494 A2 | 1/2012 | |
| WO | WO-2013063808 A1 * | 5/2013 | ............ H04W 16/14 |

OTHER PUBLICATIONS

Office Action dated May 17, 2016 in Japanese Patent Application No. 2014-548181.
Huawei, HiSilicon, "Considerations on the bandwidth reduction for low cost MTG UE" 3GPP TSG RAN WG1 #67 R1-113659, Nov. 2011, 6 Pages.
Combined Office Action and Search Report dated May 31, 2016 in Chinese Patent Application No. 201280062464.4.
United Kingdom Patents Act 1977: Search Report under Section 17, dated Apr. 23, 2012, in Patent Application No. GB1121767.6.
International Search Report dated Apr. 23, 2013, in International Application No. PCT/GB20121053157.
ETSI TS 122 368 V10.5.0 (Jul. 2011)/ 3GPP TS 22.368 version 10.5.0 Release 10), ("Digital cellular telecommunications system (Phase 2+); Universal Mobile Telecommunications System (UMTS)LTE"), (Technical Specification), 2011, 18 pages.
R1-113113, Pantech USA, 3GPP TSG-RAN WG1 #66bis meeting, Oct. 10-14, 2011, "On the reduction of baseband complexity for low cost MTC", 2 pages.
Harri Holma, et al., "LTE for UMTS OFDMA and SC-FDMA Based Radio Access", John Wiley and Sons, 2009, 4 pages.
Antti Toskala, et al., "Physical Layer", LTE for UMTS: OFDMA and SC-FDMA Based Radio Access, (John Wiley & Sons), XP55051915, Jun. 12, 2009, pp. 83-135.
Antti Toskala, et al., "LTE Radio Protocols," LTE for UMTS: OFDMA and SC-FDMA Based Radio Access, (John Wiley & Sons), XP55054236, Jun. 12, 2009, pp. 137-163.
LG Electronics, "Standards aspects for low-cost MTC", 3GPP TSG RAN WG1 #67, R1-113994, 3rd Generation Partnership Project (3GPP), vol. RAN WGl, XP50562033, Nov. 14-18, 2011, 6 pages.
Nortel Networks: "Control Channel and Data Channel Design for Relay Link in L TE-Advanced", TSG-RAN1 #55bis, R1-090153, XP008149263, Jan. 12-16, 2009, pp. 1-17.
Interdigital Communications, "Standardization aspects for low-cost MTC devices in LTE", 3GPP TSG RAN WGI Meeting #67, R1-113934, 3rd Generation Partnership Project, vol. RAN WG1, XP050561986, Nov. 14-18, 2011, 6 pages.

\* cited by examiner

TELECOMMUNICATIONS SYSTEMS AND METHODS FOR MACHINE TYPE COMMUNICATION

CROSS-REFERENCE TO RELATED APPLICATIONS

The present application is a continuation application which claims the benefit of priority under 35 U.S.C. § 120 of U.S. application Ser. No. 15/869,415, filed Jan. 12, 2018, which is a continuation of U.S. application Ser. No. 15/408,463, filed Jan. 18, 2017, (now U.S. Pat. No. 9,949,253), which is divisional of U.S. application Ser. No. 14/357,832, filed May 13, 2014, (now U.S. Pat. No. 9,572,147), which is based on PCT filing PCT/GB2012/053157, filed Dec. 17, 2012, and claims priority to British Patent Application 1121767.6, filed in the UK IPO on Dec. 19, 2011, the entire contents of each of which being incorporated herein by reference.

BACKGROUND OF THE INVENTION

The present invention relates to wireless telecommunications systems and methods, and in particular to systems and methods for allocating transmission resources in wireless telecommunication systems.

Mobile communication systems have evolved over the past ten years or so from the GSM System (Global System for Mobile communications) to the 3G system and now include packet data communications as well as circuit switched communications. The third generation partnership project (3GPP) is developing a fourth generation mobile communication system referred to as Long Term Evolution (LTE) in which a core network part has been evolved to form a more simplified architecture based on a merging of components of earlier mobile radio network architectures and a radio access interface which is based on Orthogonal Frequency Division Multiplexing (OFDM) on the downlink and Single Carrier Frequency Division Multiple Access (SC-FDMA) on the uplink.

Third and fourth generation mobile telecommunication systems, such as those based on the 3GPP defined UMTS and Long Term Evolution (LTE) architectures, are able to support a more sophisticated range of services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a class of devices and applications which, rather than taking advantage of the high data rates available, instead take advantage of the robust radio interface and increasing ubiquity of the coverage area. Examples include so-called machine type communication (MTC) applications, some of which are in some respects typified by semi-autonomous or autonomous wireless communication devices (i.e. MTC devices) communicating small amounts of data on a relatively infrequent basis. Examples include so-called smart meters which for example, are located in a customer's home and periodically transmit data back to a central MTC server relating to the customer's consumption of a utility such as gas, water, electricity and so on. Further information on characteristics of MTC-type devices can be found, for example, in the corresponding standards, such as ETSI TS 122 368 V10.530 (2011 July) 3GPP TS 22.368 version 10.5.0 Release 10[1].

Whilst it can be convenient for a terminal such as an MTC-type terminal to take advantage of the wide coverage area provided by a third or fourth generation mobile telecommunication network there are at present disadvantages. Unlike a conventional third or fourth generation mobile terminal such as a smartphone, a primary driver for MTC-type terminals will be a desire for such terminals to be relatively simple and inexpensive. The type of functions typically performed by an MTC-type terminal (e.g. simple collection and reporting of relatively small amounts of data) do not require particularly complex processing to perform, for example, compared to a smartphone supporting video streaming. However, third and fourth generation mobile telecommunication networks typically employ advanced data modulation techniques and support wide bandwidth usage on the radio interface which can require more complex and expensive radio transceivers to implement. It is usually justified to include such complex transceivers in a smartphone as a smartphone will typically require a powerful processor to perform typical smartphone type functions. However, as indicated above, there is now a desire to use relatively inexpensive and less complex devices which are nonetheless able to communicate using LTE-type networks.

With this in mind there has been proposed a concept of so-called "virtual carriers" operating within the bandwidth of a "host carrier", for example, as described in co-pending UK patent applications numbered GB 1101970.0 [2], GB 1101981.7 [3], GB 1101966.8 [4], GB 1101983.3 [5], GB 1101853.8 [6], GB 1101982.5 [7], GB 1101980.9 [8] and GB 1101972.6 [9]. A main principle underlying the concept of a virtual carrier is that a frequency sub-region within a wider bandwidth host carrier is configured for use as a self-contained carrier, for example including all control signalling within the frequency sub region. An advantage of this approach is to provide a carrier for use by low-capability terminal devices capable of operating over only relatively narrow bandwidths. This allows devices to communicate on LTE-type networks, without requiring the devices to support full bandwidth operation. By reducing the bandwidth of the signal that needs to be decoded, the front end processing requirements (e.g., FFT, channel estimation, subframe buffering etc.) of a device configured to operate on a virtual carrier are reduced since the complexity of these functions is generally related to the bandwidth of the signal received.

There are, however, some potential drawbacks with some implementations of the "virtual carrier" approach. For example, in accordance with some proposed approaches the available spectrum is hard partitioned between the virtual carrier and the host carrier. This hard partitioning can be inefficient for a number of reasons. For example, the peak data rate that can be supported by high-rate legacy devices is reduced because high-rate devices can only be scheduled a portion of the bandwidth (and not the whole bandwidth). Also, when the bandwidth is partitioned in this way there can be a loss of trunking efficiency (there is a statistical multiplexing loss).

What is more, in some respects the virtual carrier approach represents a relatively significant departure from the current operating principles for LTE-type networks. This means relatively substantial changes to the current standards would be required to incorporate the virtual carrier concept into the LTE standards framework, thereby increasing the practical difficulty of rolling out these proposed implementations.

Another proposal for reducing the required complexity of devices configured to communicate over LTE-type networks is proposed in the discussion document R1-113113 from Pantech submitted for the 3GPP TSG-RAN WG1 #66bis meeting in Zhuhai, China, 10 Oct. 2011 to 14 Oct. 2011 [10]. The proposal is for low-complexity terminal devices to be allocated a limited number of physical resource blocks as compared to a device with is fully LTE-compliant. This scheduling restriction means terminal devices can implement their turbo decoding function more simply, thereby reducing the processing complexity required. However, while this can be helpful in reducing the processing capability required for turbo decoding, significant amounts of a device's processing requirements are associated with front-end digital signal processing functions prior to turbo decoding. Such front-end digital signal processing functions include, for example, FFT/IFFT (fast Fourier transform/inverse fast Fourier transform), channel estimation, equalization, digital filtering, etc.

Accordingly, there remains a desire for approaches which allow relatively inexpensive and low complexity devices to communicate using LTE-type networks.

SUMMARY OF THE INVENTION

According to an aspect of the invention there is provided a method of operating a base station for communicating data with a terminal device in a wireless telecommunications system using a plurality of sub-carriers spanning a system frequency band, the method comprising: transmitting physical-layer control information for the terminal device using sub-carriers selected from across the system frequency band; and transmitting higher-layer data for the terminal device using sub-carriers selected from within a predetermined restricted frequency band, wherein the restricted frequency band is smaller than and within the system frequency band.

In accordance with some embodiments the restricted frequency band is defined by a standard of the wireless telecommunications system.

In accordance with some embodiments the method further comprises communicating with the terminal device to share an indication of the restricted frequency band.

In accordance with some embodiments the indication of the restricted frequency band is communicated during a connection establishment procedure in which a connection is established between the base station and the terminal device.

In accordance with some embodiments the indication of the restricted frequency band is communicated using Radio Resource Control, RRC, signalling.

In accordance with some embodiments the indication of the restricted frequency band is communicated in association with a System Information Block. SIB, of the wireless telecommunications system.

In accordance with some embodiments the indication of the restricted frequency band is communicated using a radio resource that is defined by a standard of the wireless telecommunications system.

In accordance with some embodiments the method further comprises communicating with the terminal device to share an indication of a radio resource to be used for communicating the indication of the restricted frequency band.

In accordance with some embodiments the indication of the radio resource is communicated during a connection establishment procedure in which a connection is established between the base station and the terminal device.

In accordance with some embodiments the indication of the radio resource is communicated in association with a Master Information Block, MIB, of the wireless telecommunications system.

In accordance with some embodiments the indication of the radio resource is communicated using a physical broadcast channel of the wireless telecommunications system.

In accordance with some embodiments the indication of the radio resource is communicated by the base station transmitting physical-layer control information having a format selected to provide the indication of the radio resource.

In accordance with some embodiments the physical-layer control information of the pre-defined format is transmitted on a physical downlink control channel of the wireless telecommunications system.

In accordance with some embodiments the physical-layer control information for the terminal devices comprise an indication of transmission resource allocations for the higher-layer data for the terminal device.

In accordance with some embodiments the physical-layer control information for the terminal device is transmitted on a physical downlink control channel of the wireless telecommunications system.

In accordance with some embodiments the higher-layer data for the terminal device is transmitted on a physical downlink shared channel of the wireless telecommunications system.

According to an aspect of the invention there is provided a method of operating a base station for communicating data with terminal devices in a wireless telecommunications system using radio subframes comprising a plurality of symbols, the method comprising: transmitting physical-layer control information from the base station to a first terminal device and to a second terminal device using a first group of the symbols in a radio subframe; transmitting higher-layer data from the base station to the first terminal device using a second group of the symbols in the radio subframe and transmitting higher-layer data from the base station to the second terminal device using a third group of the symbols in the radio subframe, wherein the number of symbols in the third group is fewer than the number of symbols in the second group.

According to an aspect of the invention there is provided a base station for communicating data with terminal devices in a wireless telecommunications system using a plurality of sub-carriers spanning a system frequency band, wherein the base station is configured to: transmit physical-layer control information for a terminal device using sub-carriers selected from across the system frequency band; and transmit higher-layer data for the terminal device using sub-carriers selected from within a predetermined restricted frequency band, wherein the restricted frequency band is smaller than and within the system frequency band.

In accordance with some embodiments the restricted frequency band is defined by a standard of the wireless telecommunications system.

In accordance with some embodiments the base station is configured to communicate with the terminal device to share an indication of the restricted frequency band.

In accordance with some embodiments the base station is configured such that the indication of the restricted frequency band is communicated during a connection establishment procedure in which a connection is established between the base station and the terminal device.

In accordance with some embodiments the base station is configured such that the indication of the restricted frequency band is communicated using Radio Resource Control, RRC, signalling.

In accordance with some embodiments the base station is configured such that the indication of the restricted frequency band is communicated in association with a System Information Block, SIB, of the wireless telecommunications system.

In accordance with some embodiments the base station is configured such that the indication of the restricted frequency band is communicated using a radio resource that is defined by a standard of the wireless telecommunications system.

In accordance with some embodiments the base station is configured to communicate with the terminal device to share an indication of a radio resource to be used for communicating the indication of the restricted frequency band.

In accordance with some embodiments the base station is configured such that the indication of the radio resource is communicated during a connection establishment procedure in which a connection is established between the base station and the terminal device.

In accordance with some embodiments the base station is configured such that the indication of the radio resource is communicated in association with a Master Information Block, MIB, of the wireless telecommunications system.

In accordance with some embodiments the base station is configured such that the indication of the radio resource is communicated using a physical broadcast channel of the wireless telecommunications system.

In accordance with some embodiments the base station is configured such that the indication of the radio resource is communicated by transmitting physical-layer control information having a format selected to provide the indication of the radio resource.

In accordance with some embodiments the base station is configured to transmit the physical-layer control information of the pre-defined format on a physical downlink control channel of the wireless telecommunications system.

In accordance with some embodiments the physical-layer control information for the terminal device comprises an indication of transmission resource allocations for the higher-layer data for the terminal device.

In accordance with some embodiments the base station is configured to transmit the physical-layer control information for the terminal device on a physical downlink control channel of the wireless telecommunications system.

In accordance with some embodiments the base station is configured to transmit the higher-layer data for the terminal device on a physical downlink shared channel of the wireless telecommunications system.

According to an aspect of the invention there is provided a base station for communicating data with terminal devices in a wireless telecommunications system using radio subframes comprising a plurality of symbols, wherein the base station is configured to: transmit physical-layer control information from the base station to a first terminal device and to a second terminal device using a first group of the symbols in a radio subframe, transmit higher-layer data from the base station to the first terminal device using a second group of the symbols in the radio subframe; and transmit higher-layer data from the base station to the second terminal device using a third group of the symbols in the radio subframe, wherein the number of symbols in the third group is fewer than the number of symbols in the second group.

According to an aspect of the invention there is provided a system comprising a base station in accordance with any of the above-mentioned aspects of the invention and a terminal device.

According to an aspect of the invention there is provided a method of operating a terminal device for receiving data from a base station in a wireless telecommunications system using a plurality of sub-carriers spanning a system frequency band, the method comprising: receiving and buffering physical-layer control information transmitted by the base station on sub-carriers spanning the system frequency band; receiving and buffering higher-layer data transmitted by the base station on sub-carriers spanning a predetermined restricted frequency band, wherein the restricted frequency band is smaller than and within the system frequency band; processing the buffered physical-layer control information to determine an allocation of higher-layer data for the terminal device within the restricted frequency band; and processing the buffered higher-layer data to extract the allocation of higher-layer data for the terminal device from the restricted frequency band.

It will be appreciated that receiving and buffering physical-layer control information may in general involve receiving and buffering transmission resources that carry the physical-layer control information. For example, the transmission resources may be resource elements containing physical-layer control information. A resource element may, for example in an LTE-type network, comprise a subcarrier on a single symbol. In this context a resource element may thus transmit a single modulation symbol (i.e. a single QPSK/16QAM/64QAM modulation symbol). It will similarly be appreciated that receiving and buffering higher-layer data may in general involve receiving and buffering transmission resources that carry higher-layer data.

In accordance with some embodiments the restricted frequency band is defined by a standard of the wireless telecommunications system.

In accordance with some embodiments the method further comprises communicating with the base station to share an indication of the restricted frequency band.

In accordance with some embodiments the indication of the restricted frequency band is communicated during a connection establishment procedure in which a connection is established between the terminal device and the base station.

In accordance with some embodiments the indication of the restricted frequency band is communicated using Radio Resource Control, RRC, signalling.

In accordance with some embodiments the indication of the restricted frequency band is communicated in association with a System Information Block, SIB, of the wireless telecommunications system.

In accordance with some embodiments the indication of the restricted frequency band is communicated using a radio resource that is defined by a standard of the wireless telecommunications system.

In accordance with some embodiments the method further comprises communicating with the base station to share an indication of a radio resource to be used for communicating the indication of the restricted frequency band.

In accordance with some embodiments the indication of the radio resource is communicated during a connection establishment procedure in which a connection is established between the terminal device and the base station.

In accordance with some embodiments the indication of the radio resource is communicated in association with a Master information Block, MIB, of the wireless telecommunications system.

In accordance with some embodiments the indication of the radio resource is communicated using a physical broadcast channel of the wireless telecommunications system.

In accordance with some embodiments the indication of the radio resource is received by the terminal device as physical-layer control information having a format selected by the base station to provide the indication of the radio resource.

In accordance with some embodiments the physical-layer control information of the pre-defined format is received by the terminal on a physical downlink control channel of the wireless telecommunications system.

In accordance with some embodiments the physical-layer control information comprises an indication of transmission resource allocations for the higher-layer data.

In accordance with some embodiments the physical-layer control information is received on a physical downlink control channel of the wireless telecommunications system.

In accordance with some embodiments the higher-layer data is received on a physical downlink shared channel of the wireless telecommunications system.

According to an aspect of the invention there is provided a method of operating a mobile device for receiving data in a wireless telecommunications system using radio subframes comprising a plurality of symbols, the method comprising: receiving and buffering physical-layer control information transmitted by the base station using a first group of the symbols in a radio subframe; receiving and buffering higher-layer data transmitted by the base station using a second group of the symbols of the radio subframe, wherein the number of the symbols in the second group is less than the number of the symbols of the subframe available for transmitting higher-layer data to other terminal devices; processing the buffered physical-layer control information to determine an allocation of higher-layer data for the terminal device within the second group of the symbols in the subframe; and processing the buffered higher-layer data to extract the allocation of higher-layer data for the terminal device from the second group of the symbols in the subframe.

According to an aspect of the invention there is provided a mobile terminal for receiving data from a base station in a wireless communications system using a plurality of sub-carriers spanning a system frequency band, wherein the mobile terminal is configured to: receive and buffer physical-layer control information transmitted by the base station on sub-carriers spanning the system frequency band; receive and buffer higher-layer data transmitted by the base station on sub-carriers spanning a predetermined restricted frequency band, wherein the restricted frequency band is smaller than and within the system frequency band; process the buffered physical-layer control information to determine an allocation of higher-layer data for the terminal device within the restricted frequency band; and process the buffered higher-layer data to extract the allocation of higher-layer data for the terminal device from the restricted frequency band.

In accordance with some embodiments the restricted frequency band is defined by a standard of the wireless telecommunications system.

In accordance with some embodiments the mobile terminal is configured to communicate with the base station to share an indication of the restricted frequency band.

In accordance with some embodiments the mobile terminal is configured such that the indication of the restricted frequency band is communicated during a connection establishment procedure in which a connection is established between the mobile terminal and the base station.

In accordance with some embodiments the mobile terminal is configured such that the indication of the restricted frequency band is communicated using Radio Resource Control, RRC, signalling.

In accordance with some embodiments the mobile terminal is configured such that the indication of the restricted frequency band is communicated in association with a System Information Block. SIB, of the wireless telecommunications system.

In accordance with some embodiments the mobile terminal is configured such that the indication of the restricted frequency band is communicated using a radio resource that is defined by a standard of the wireless telecommunications system.

In accordance with some embodiments the mobile terminal is configured to communicate with the base station to share an indication of a radio resource to be used for communicating the indication of the restricted frequency band.

In accordance with some embodiments the mobile terminal is configured such that the indication of the radio resource is communicated during a connection establishment procedure in which a connection is established between the mobile terminal and the base station.

In accordance with some embodiments the mobile terminal is configured such that the indication of the radio resource is communicated in association with a Master Information Block, MIB, of the wireless telecommunications system.

In accordance with some embodiments the mobile terminal is configured such that the indication of the radio resource is communicated using a physical broadcast channel of the wireless telecommunications system.

In accordance with some embodiments the mobile terminal is configured such that the indication of the radio resource is received by transmitting physical-layer control information having a format selected to provide the indication of the radio resource.

In accordance with some embodiments the mobile terminal is configured to receive the indication of the radio resource as physical-layer control information having a format selected by the base station to provide the indication of the radio resource.

In accordance with some embodiments the physical-layer control information for the terminal device comprises an indication of transmission resource allocations for the higher-layer data.

In accordance with some embodiments the mobile terminal is configured to receive the physical-layer control information on a physical downlink control channel of the wireless telecommunications system.

In accordance with some embodiments the mobile terminal is configured to receive the higher-layer data on a physical downlink shared channel of the wireless telecommunications system.

According to an aspect of the invention there is provided a mobile terminal for communicating data with a base station in a wireless telecommunications system using radio subframes comprising a plurality of symbols, wherein the mobile terminal is configured to: receive and buffer physical-layer control information transmitted by the base station using a first group of the symbols in a radio subframe;

receive and buffer higher-layer data transmitted by the base station using a second group of the symbols of the radio subframe, wherein the number of the symbols in the second group is less than the number of the symbols of the subframe available for transmitting higher-layer data to other terminal devices; process the buffered physical-layer control information to determine an allocation of higher-layer data for the terminal device within the second group of the symbols in the subframe; and process the buffered higher-layer data to extract the allocation of higher-layer data for the terminal device from the second group of the symbols in the subframe.

According to an aspect of the invention there is provided a system comprising a base station and a terminal device in accordance with any of the above-mentioned aspects of the invention.

It will be appreciated that features and aspects of the invention described above in relation to the first and other aspects of the invention are equally applicable and may be combined with embodiments of the invention according to the different aspects of the invention as appropriate, and not just in the specific combinations described above.

BRIEF DESCRIPTION OF DRAWINGS

Embodiments of the present invention will now be described by way of example only with reference to the accompanying drawings where like parts are provided with corresponding reference numerals and in which.

DESCRIPTION OF EXAMPLE EMBODIMENTS

Figure 1:
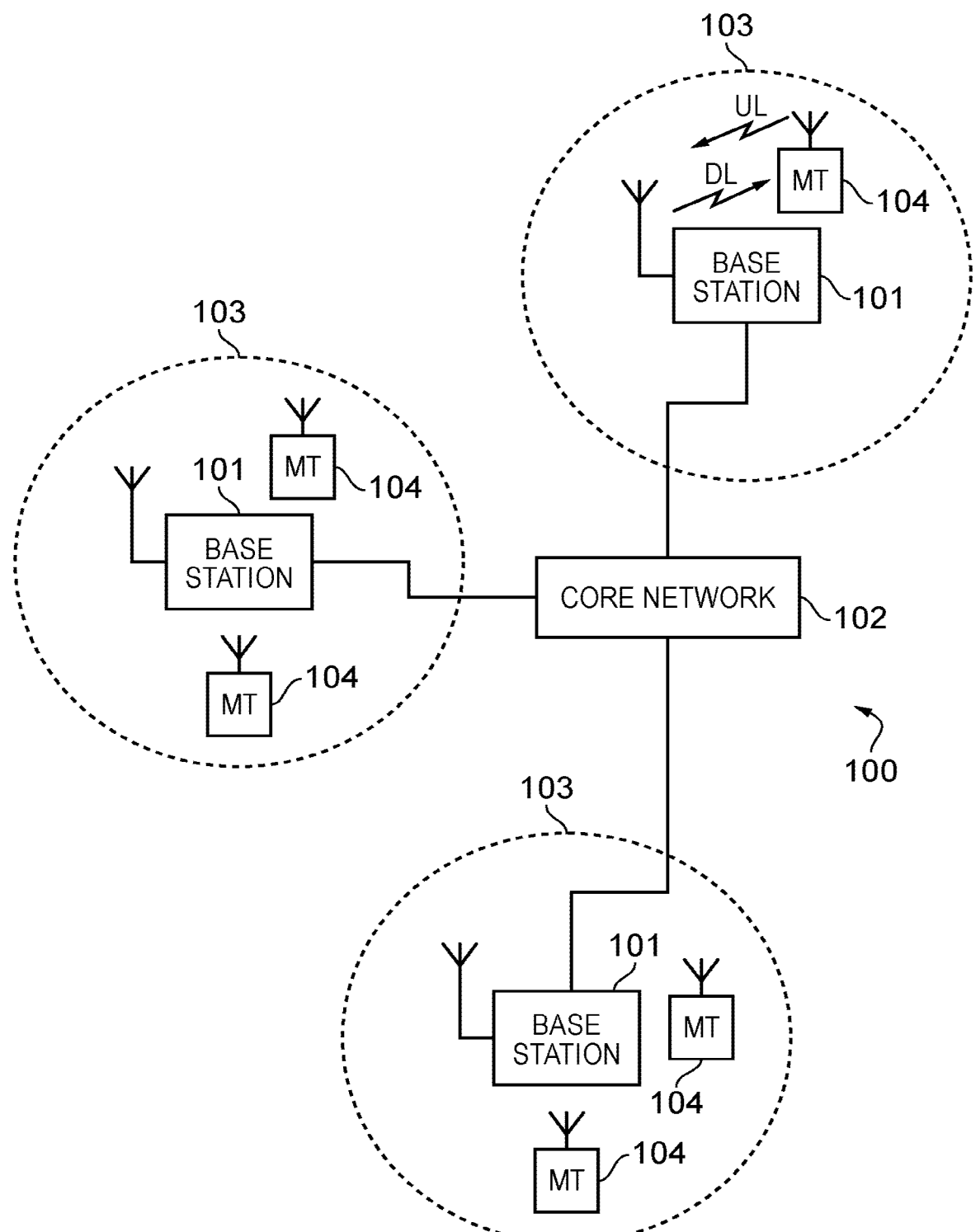
FIG. 1 provides a schematic diagram illustrating an example of a conventional mobile telecommunication system.

FIG. 1 provides a schematic diagram illustrating some basic functionality of a mobile telecommunications network/system 100 operating in accordance with LTE principles and which may be adapted to implement embodiments of the invention as described further below Various elements of FIG. 1 and their respective modes of operation are well-known and defined in the relevant standards administered by the 3GPP® body and also described in many books on the subject, for example, Holma H. and Toskala A [11]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, and so forth. Base stations may also be referred to as transceiver stations/nodeBs/e-nodeBs. and so forth.

Figure 2:
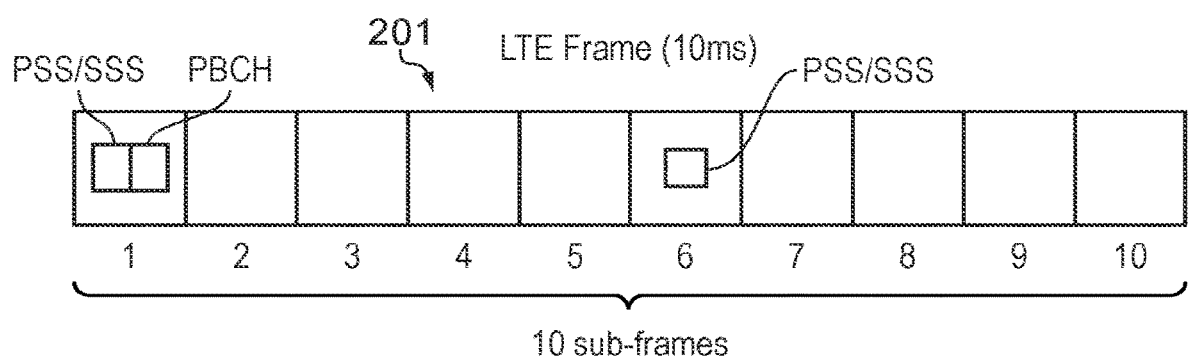
FIG. 2 provides a schematic diagram illustrating a conventional LTE radio frame.

Mobile telecommunications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink. FIG. 2 shows a schematic diagram illustrating an OFDM based LTE downlink radio frame 201. The LTE downlink radio frame is transmitted from an LTE base station (known as an enhanced Node B) and lasts 10 ms. The downlink radio frame comprises ten subframes, each subframe lasting 1 ms. A primary synchronisation signal (PSS) and a secondary synchronisation signal (SSS) are transmitted in the first and sixth subframes of the LTE frame A physical broadcast channel (PBCH), is transmitted in the first subframe of the LTE frame.

Figure 3:
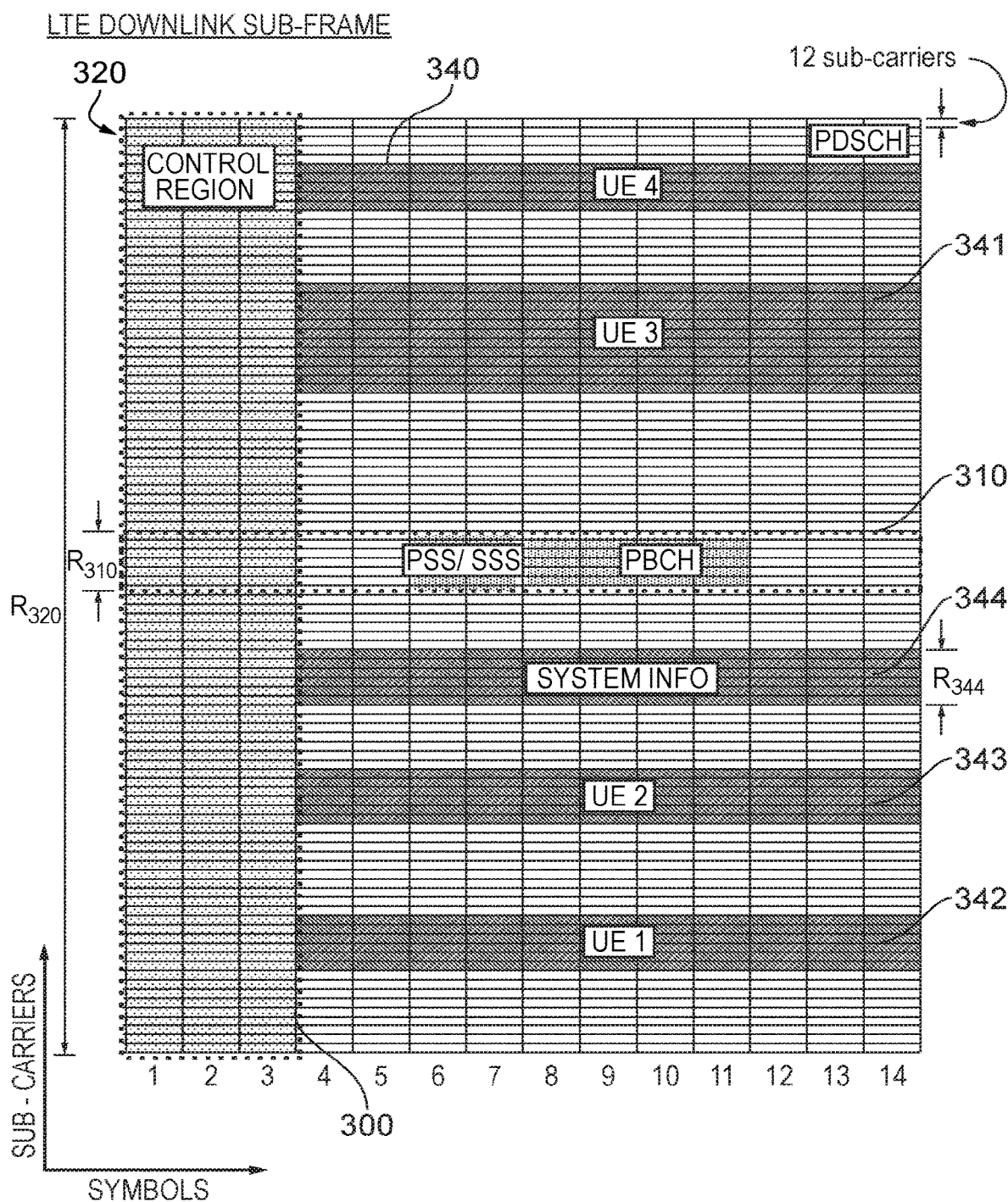
FIG. 3 provides a schematic diagram illustrating an example of a conventional LTE downlink radio subframe.

FIG. 3 is a schematic diagram of a grid which illustrates the structure of an example conventional downlink LTE subframe. The subframe comprises a predetermined number of symbols which are transmitted over a 1ns period. Each symbol comprises a predetermined number of orthogonal sub-carriers distributed across the bandwidth of the downlink radio carrier.

The example sub frame shown in FIG. 3 comprises 14 symbols and 1200 sub-carriers spread across a 20 MHz bandwidth and is the first subframe in a frame (hence it contains PBCH). The smallest allocation of physical resource for transmission in LTE is a resource block comprising twelve sub-carriers transmitted over one subframe. For clarity, in FIG. 3, each individual resource element is not shown, instead each individual box in the subframe grid corresponds to twelve sub-carriers transmitted on one symbol.

FIG. 3 shows in hatching resource allocations for four LTE terminals 340, 341, 342, 343. For example, the resource allocation 342 for a first LTE terminal (UE 1) extends over five blocks of twelve sub-carriers (i.e. 60 sub-carriers), the resource allocation 343 for a second LTE terminal (UE2) extends over six blocks of twelve sub-carriers (i.e. 72 sub-carriers) and so on.

Control channel data is transmitted in a control region 300 (indicated by dotted-shading in FIG. 3) of the subframe comprising the first n symbols of the subframe where n can vary between one and three symbols for channel bandwidths of 3 MHz or greater and where n can vary between two and four symbols for a channel bandwidth of 1.4 MHz. For the sake of providing a concrete example, the following description relates to host carriers with a channel bandwidth of 3 MHz or greater so the maximum value of n will be 3 (as in the example of FIG. 3). The data transmitted in the control region 300 includes data transmitted on the physical downlink control channel (PDCCH), the physical control format indicator channel (PCFICH) and the physical HARQ indicator channel (PHICH). These channels transmit physical layer control information.

PDCCH contains control data indicating which sub-carriers of the subframe have been allocated to specific LTE terminals. This may be referred to as physical-layer control signalling/data. Thus, the PDCCH data transmitted in the control region 300 of the subframe shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (i.e. between one and three symbols for channel bandwidths of 3 MHz or greater).

PHICH contains HARQ (Hybrid Automatic Request) data indicating whether or not previously transmitted uplink data has been successfully received by the network.

Symbols in a central band 310 of the time-frequency resource grid are used for the transmission of information including the primary synchronisation signal (PSS, the secondary synchronisation signal (SSS) and the physical broadcast channel (PBCH). This central band 310 is typically 72 sub-carriers wide (corresponding to a transmission bandwidth of 1.08 MHz). The PSS and SSS are synchronisation signals that once detected allow an LTE terminal device to achieve frame synchronisation and determine the physical layer cell identity of the enhanced Node B transmitting the downlink signal. The PBCH carries information about the cell, comprising a master information block (MIB) that includes parameters that LTE terminals use to properly access the cell. Data transmitted to individual LTE terminals on the physical downlink shared channel (PDSCH) can be transmitted in other resource elements of the subframe. In general PDSCH conveys a combination of user-plane data and non-physical layer control-plane data (such as Radio Resource Control (RRC) and Non Access Stratum (NAS) signalling). The user-plane data and non-physical layer control-plane data conveyed on PDSCH may be referred to as higher layer data (i.e. data associated with a layer higher than the physical layer).

FIG. 3 also shows a region of PDSCH containing system information and extending over a bandwidth of $R_{344}$. A conventional LTE subframe will also include reference signals which are discussed further below but not shown in FIG. 3 in the interests of clarity.

The number of sub-carriers in an LTE channel can vary depending on the configuration of the transmission network. Typically this variation is from 72 sub carriers contained within a 1.4 MHz channel bandwidth to 1200 sub-carriers contained within a 20 MHz channel bandwidth (as schematically shown in FIG. 3). As is known in the art, data transmitted on the PDCCH, PCFICH and PHFICH is typically distributed on the sub-carriers across the entire bandwidth of the subframe to provide for frequency diversity. Therefore a conventional LTE terminal must be able to receive the entire channel bandwidth in order to receive and decode the control region.

Figure 4:
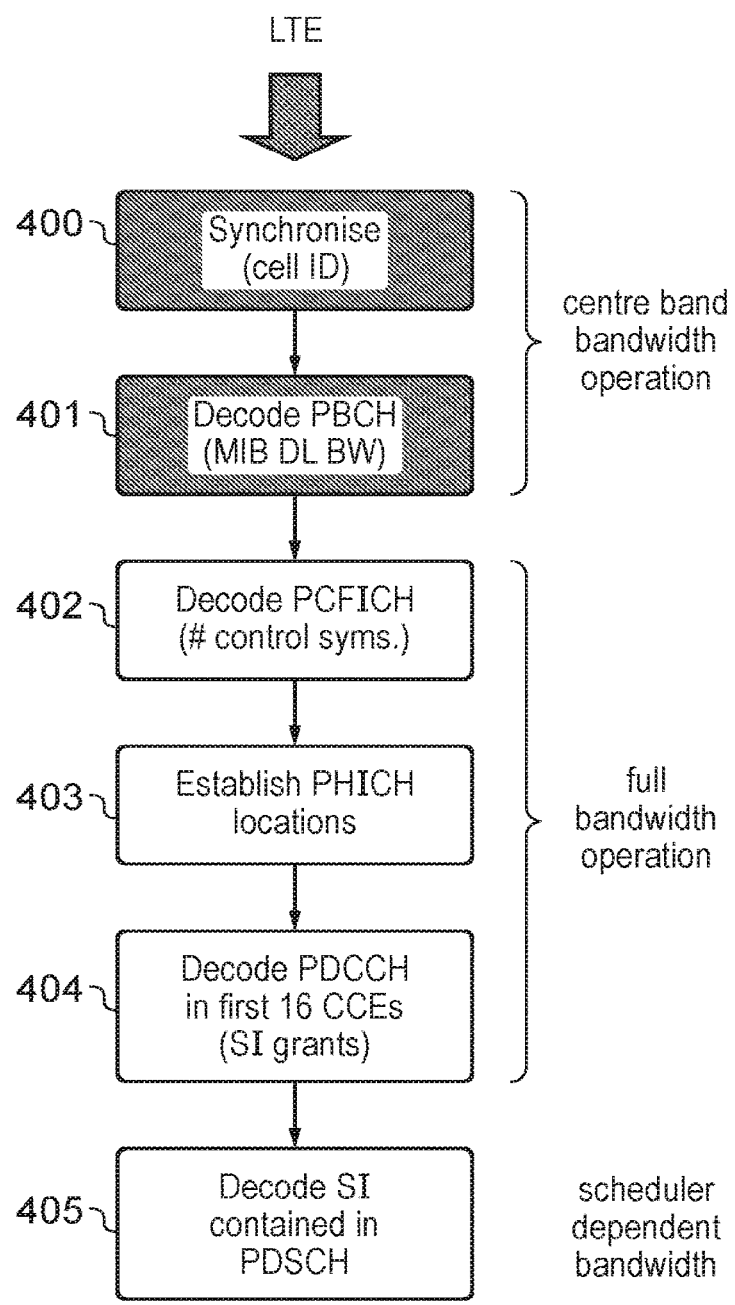
FIG. 4 provides a schematic diagram illustrating a conventional LTE "camp-on" procedure.

FIG. 4 illustrates an LTE "camp-on" process, that is, the process followed by a terminal so that it can decode downlink transmissions which are sent by a base station via a downlink channel. Using this process, the terminal can identify the parts of the transmissions that include system information for the cell and thus decode configuration information for the cell.

As can be seen in FIG. 4, in a conventional LTE camp-on procedure, the terminal first synchronizes with the base station (step 400) using the PSS and SSS in the centre band and then decodes the PBCH (step 401). Once the terminal has performed steps 400 and 401, it is synchronized with the base station.

For each subframe, the terminal then decodes the PCFICH which is distributed across the entire bandwidth of carrier 320 (step 402). As discussed above, an LTE downlink carrier can be up to 20 MHz wide (1200 sub-carriers) and a standard LTE-compliant terminal therefore has to have the capability to receive and decode transmissions on a 20 MHz bandwidth in order to decode the PCFICH. Accordingly, at the PCFICH decoding stage, with a 20 MHz carrier band, the terminal operates at a larger bandwidth (bandwidth of $R_{320}$) than during steps 400 and 401 (bandwidth of $R_{310}$) relating to synchronization and PBCH decoding.

The terminal then ascertains the PHICH locations (step 403) and decodes the PDCCH (step 404), in particular for identifying system information transmissions and for identifying its personal allocation grants. The allocation grants are used by the terminal to locate system information and to locate its data in the PDSCH. Both system information and personal allocations are transmitted on PDSCH and scheduled within the carrier band 320. Steps 403 and 404 also require a standard LTE-compliant terminal to operate on the entire bandwidth $R_{320}$ of the carrier band.

At steps 402 to 404, the terminal decodes information contained in the control region 300 of a subframe. As explained above, in LTE, the three control channels mentioned above (PCFICH, PHICH and PDCCH) can be found across the control region 300 of the carrier where the control region extends over the range $R_{320}$ and occupies the first one, two or three OFDM symbols of each subframe as discussed above. In a subframe, typically the control channels do not use all the resource elements within the control region 300, but they are scattered across the entire region, such that an LTE terminal has to be able to simultaneously receive the entire control region 300 for decoding each of the three control channels.

The terminal can then decode the PDSCH (step 405) which contains system information or data transmitted for this terminal.

As explained above, in an LTE subframe the PDSCH generally occupies groups of resource elements which are neither in the control region nor in the resource elements occupied by PSS, SSS or PBCH. The data in the blocks of resource elements 340, 341, 342, 343 allocated to the different mobile communication terminals (UEs) shown in FIG. 3 have a smaller bandwidth than the bandwidth of the entire carrier, although to decode these blocks a terminal first receives the PDCCH spread across the frequency range $R_{320}$ to determine if the PDCCH indicates that a PDSCH resource is allocated to the UE and should be decoded. Once a UE has received the entire subframe, it can then decode the PDSCH in the relevant frequency range (if any) indicated by the PDCCH. So for example, UE 1 discussed above decodes the whole control region 300 to determine its resource allocation and then extracts the relevant data from the corresponding resource block 342.

Figure 5:
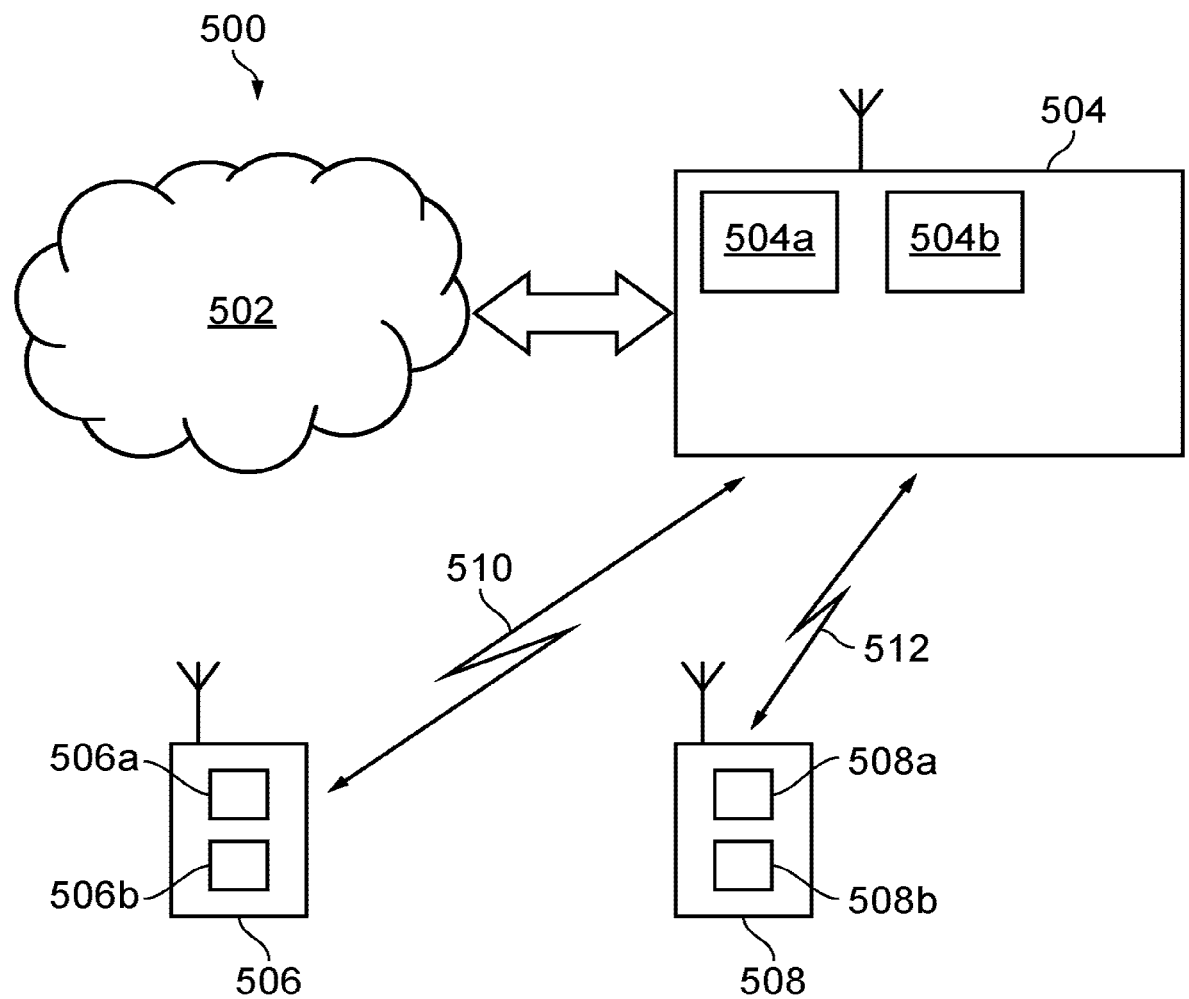
FIG. 5 schematically represents a wireless telecommunications system according to an embodiment of the invention.

FIG. 5 schematically shows a telecommunications system 500 according to an embodiment of the invention. The telecommunications system 500 in this example is based broadly on an LTE-type architecture. As such many aspects of the operation of the telecommunications system 500 are standard and well understood and not described here in detail in the interest of brevity. Operational aspects of the telecommunications system 500 which are not specifically described herein may be implemented in accordance with any known techniques, for example according to the LTE-standards.

The telecommunications system 500 comprises a core network part (evolved packet core) 502 coupled to a radio network part. The radio network part comprises a base station (evolved-nodeB) 504, a first terminal device 506 and a second terminal device 508. It will of course be appreciated that in practice the radio network part may comprise a plurality of base stations serving a larger number of terminal devices across various communication cells. However, only a single base station and two terminal devices are shown in FIG. 5 in the interests of simplicity.

As with a conventional mobile radio network, the terminal devices 506, 508 are arranged to communicate data to and from the base station (transceiver station) 504. The base station is in turn communicatively connected to a serving gateway, S-GW, (not shown) in the core network part which is arranged to perform routing and management of mobile communications services to the terminal devices in the telecommunications system 500 via the base station 504. In order to maintain mobility management and connectivity, the core network part 502 also includes a mobility management entity (not shown) which manages the enhanced packet service, EPS, connections with the terminal devices 506, 508 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 502 to an external packet data network, for example the Internet. As noted above, the operation of the various elements of the communications system 500 shown in FIG. 5 may be broadly conventional apart from where modified to provide functionality in accordance with embodiments of the invention as discussed herein.

In this example, it is assumed the first terminal device 506 is a conventional smartphone type terminal device communicating with the base station 504. Thus, and as is conventional, this first terminal device 504 comprises a transceiver unit 506a for transmission and reception of wireless signals and a controller unit 506b configured to control the smart phone 506. The controller unit 506b may comprise a processor unit which is suitably configured/programmed to provide the desired functionality using conventional programming/configuration techniques for equipment in wireless telecommunications systems. The transceiver unit 506a and the controller unit 506b are schematically shown in FIG. 5 as separate elements. However, it will be appreciated that the functionality of these units can be provided in various different ways, for example using a single suitably programmed integrated circuit. As will be appreciated the smart phone 506 will in general comprise various other elements associated with its operating functionality.

In this example, it is assumed the second terminal device 508 is a machine-type communication (MTC) terminal device. As discussed above, these types of device may be typically characterised as semi-autonomous or autonomous wireless communication devices communicating small amounts of data. Examples include so-called smart meters which, for example, may be located in a customer's house and periodically transmit information back to a central MTC server data relating to the customer's consumption of a utility such as gas, water, electricity and so on. MTC devices may in some respects be seen as devices which can be supported by relatively low bandwidth communication channels having relatively low quality of service (QoS), for example in terms of latency. It is assumed here the MTC terminal device 508 in FIG. 5 is such a device.

As with the smart phone 506, the MTC device 508 comprises a transceiver unit 508a for transmission and reception of wireless signals and a controller unit 508b configured to control the MTC device 508. The controller unit 508b may comprise a processor unit which is suitably configured/programmed to provide the desired functionality described herein using conventional programming/configuration techniques for equipment in wireless telecommunications systems. The transceiver unit 508a and the controller unit 508b are schematically shown in FIG. 5 as separate elements for ease of representation. However, it will be appreciated that the functionality of these units can be provided in various different ways following established practices in the an, for example using a single suitably programmed integrated circuit. It will be appreciated the MTC device 508 will in general comprise various other elements associated with its operating functionality.

The base station 504 comprises a transceiver unit 504a for transmission and reception of wireless signals and a controller unit 504b configured to control the base station 504. The controller unit 504b may comprise a processor unit which is suitably configured/programmed to provide the desired functionality described herein using conventional programming/configuration techniques for equipment in wireless telecommunications systems. The transceiver unit 504a and the controller unit 504b are schematically shown in FIG. 5 as separate elements for ease of representation. However, it will be appreciated that the functionality of these units can be provided in various different ways following established practices in the art, for example using a single suitably programmed integrated circuit. It will be appreciated the base station 504 will in general comprise various other elements associated with its operating functionality.

Thus, the base station 504 is configured to communicate data with the smart phone 506 over a first radio communication link 510 and communicate data with the MTC device 508 over a second radio communication link 512.

It is assumed here the base station 504 is configured to communicate with the smart phone 506 over the first radio communication link 510 in accordance with the established principles of LTE-based communications.

Figure 6:
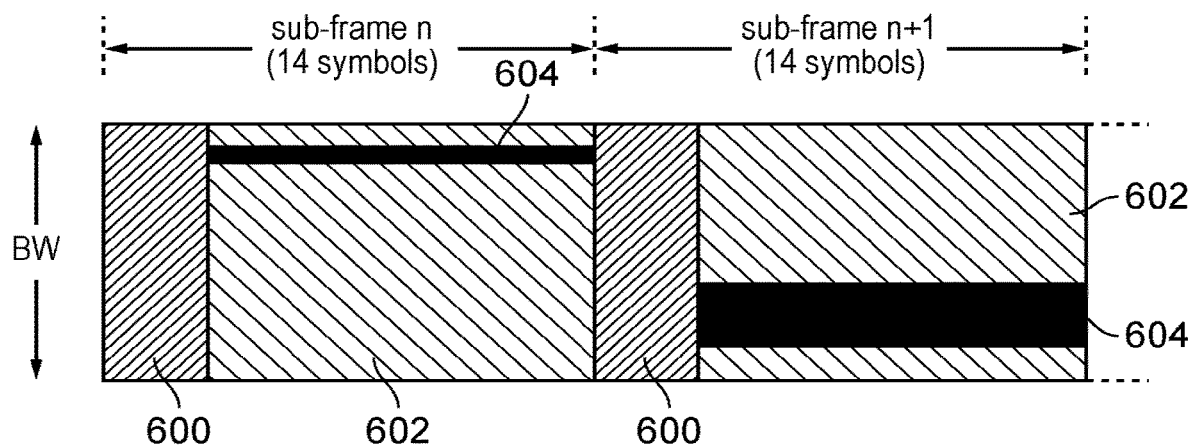
FIG. 6 schematically represents two arbitrary downlink subframes as seen by a conventional terminal device operating in the wireless telecommunications system of FIG. 5.

FIG. 6 schematically represents two arbitrary downlink subframes (identified as subframe n and subframe n+1) as seen by the smart phone 506 according to the established LTE standards as discussed above. Each subframe is in essence a simplified version of what is represented in FIG. 3. Thus, each subframe comprises a control region 600 supporting the PCFICH, PHICH and PDCCH channels as discussed above and a PDSCH region 602 for communicating higher-layer data (for example user-plane data and non-physical layer control-plane signalling) to respective terminal devices, such as the smart phone 506, as well as system information, again as discussed above. For the sake of giving a concrete example, the frequency bandwidth (BW) of the carrier with which the subframes are associated is taken to be 20 MHz. Also schematically shown in FIG. 6 by black shading are example PDSCH downlink allocations 604 for the smart phone 506. In accordance with the defined standards, and as discussed above, individual terminal devices derive their specific downlink allocations for a subframe from PDCCH transmitted in the control region 600 of the subframe. For the arbitrary example shown in FIG. 6, the smart phone 506 is allocated downlink resources spanning a relatively small fraction of the 20 MHz bandwidth near to the upper end of the carrier frequency in subframe n, and is allocated a larger fraction of the available 20 MHz bandwidth at a lower frequency m subframe n+1. The specific allocations of PDSCH resources for the smart phone are determined by a scheduler in the network based on the data needs for the device in accordance with standard techniques.

Although the smart phone 506 is typically only allocated a subset of the available PDSCH resources in any given subframe, the smart phone 506 could be allocated these resources anywhere across the full PDSCH bandwidth (BW). Accordingly, the smart phone will in the first instance receive and buffer the entire subframe. The smart phone 506 will then process the subframe to decode PDCCH to determine what resources are allocated on PDSCH, and then process the data received during PDSCH symbols and extracts the relevant higher-layer data therefrom.

Thus, referring to FIG. 6, the smart phone 506 represented in FIG. 5 buffers for each subframe the entire control region 600 (shaded dark grey in FIG. 6) and the entire PDSCH region 602 (transmitted in the resources contained in the areas shaded light grey and black in FIG. 6), and extracts the higher-layer data allocated to the smart phone (transmitted in the resources contained in the area shaded black in FIG. 6) from the PDSCH region 602 based on allocation information conveyed in the control region 600.

The inventor has recognised that the requirement for terminal devices to buffer and process each complete subframe to identify and extract what will typically be only a small fraction of the total PDSCH resources contained in the subframe for the terminal device introduces a significant processing overhead. Accordingly, the inventor has conceived of approaches in accordance with which example embodiments of the invention may allow for a terminal device, for example an MTC device, to operate generally in accordance with the principles of existing networks, but without needing to buffer and process an entire subframe to identify and extract its own higher-layer data from that subframe.

This can be achieved in accordance with some embodiments of the invention by pre-establishing a restricted frequency band within which higher-layer data. e.g. on PDSCH in LTE, may be communicated from a base station to a terminal device, wherein the restricted frequency band is narrower than the overall system frequency band (carrier bandwidth) used for communicating physical-layer control information. e.g. on PDCCH in LTE. Thus the base station may be configured to only allocate downlink resources for the terminal device on PDSCH within the restricted frequency band. Because the terminal device knows in advance that it will only be allocated PDSCH resources within the restricted frequency band, the terminal device does not need to buffer and process any PDSCH resources from outside the pre-determined restricted frequency band. This principle is schematically shown in FIG. 7.

Figure 7:
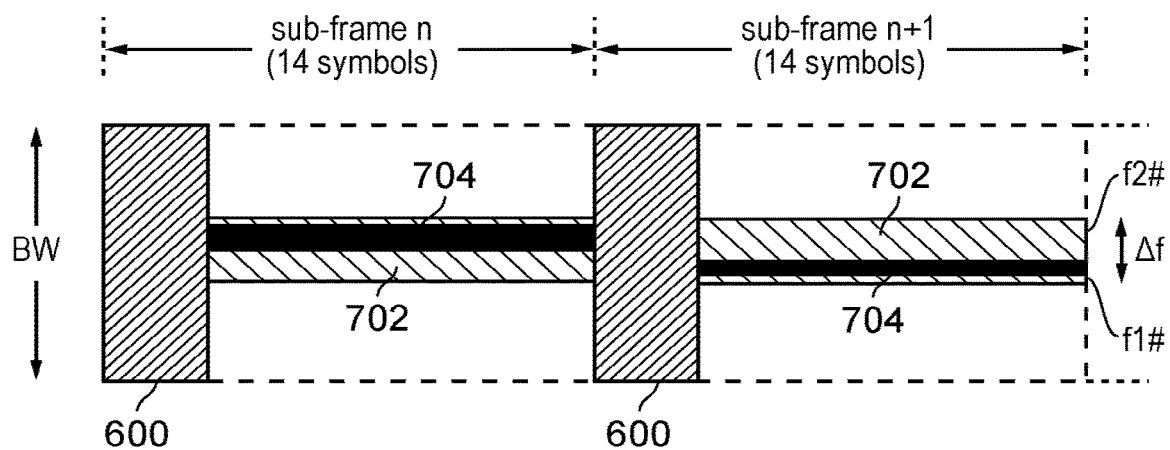
FIG. 7 schematically represents two arbitrary downlink subframes as seen by a terminal device operating according to an embodiment of the invention in the wireless telecommunications system of FIG. 5.

FIG. 7 schematically represents two arbitrary downlink subframes (identified as subframe n and subframe n+1) as seen by the MTC device 508 according to an embodiment of the invention. FIG. 7 is in some respects similar to FIG. 6, and aspects of FIG. 7 which directly correspond to aspects of FIG. 6 are not described again in detail.

In this example it is assumed the base station 504 and the MTC device 508 have both pre-established that higher-layer data is to be communicated from the base station to the MTC device only within a restricted frequency band defined by upper and lower frequencies f1# and f2# (having a bandwidth $\Delta f$). In this example the restricted frequency band encompasses the central part of the overall system (carrier) frequency band BW. For the sake of a concrete example, the restricted frequency band is assumed here to have a bandwidth ($\Delta f$) of 1.4 MHz and to be centred on the overall system bandwidth i.e. f1#=fc−$\Delta f$/2 and f2#=fc+$\Delta f$/2, where fc is the central frequency of the system frequency band). There are various mechanisms by which the frequency band can be established/shared between a base station and terminal device and some of these are discussed further below.

FIG. 7 represents in shading the portions of each subframe for which the MTC device 508 is arranged to buffer resource elements ready for processing. The buffered part of each subframe comprises a control region 600 supporting conventional physical-layer control information, such as the PCFICH, PHICH and PDCCH channels as discussed above and a restricted PDSCH region 702. The physical-layer control regions 600 that are buffered by the MTC device 50 are the same as the physical-layer control regions 600 buffered by the smart phone device 506 as represented in FIG. 6. However, the PDSCH regions 702 carrying higher-layer data which are buffered by the MTC device 508 are smaller than the PDSCH regions 602 buffered by the smart phone device 506 as represented in FIG. 6. This is possible because, as noted above, in accordance with an embodiment of the invention, the base station 504 is adapted so that higher-layer data on PDSCH can be allocated to the terminal device 508 only on subcarriers within the restricted frequency band f1# to f2#, and the MTC terminal device 508 "knows" this, and so can be configured to ignore (i.e. not buffer) PDSCH resources that are outside the restricted frequency band within which the terminal device might potentially be allocated downlink resources.

Also schematically shown in FIG. 7 by black shading are example PDSCH downlink allocations 704 for the MTC device 508 within the restricted frequency band. The MTC device 508 may be configured to derive its specific PDSCH downlink allocations 704 for each subframe from PDCCH transmitted in the control region 600 of the subframe in accordance with the defined standards. That is to say, the principles for communicating to the MTC device 508 the downlink allocations 704 it has been allocated within the restricted frequency band does not need modifying to implement an embodiment of the invention. The MTC device 508 will typically only be allocated a subset of the PDSCH resources within the restricted frequency band in any given subframe, although in accordance with an embodiment of the invention, the MTC device 508 could be allocated these resources anywhere across the restricted frequency band. Accordingly, the MTC device will in the first instance receive and buffer the entire control region 600 and the entire restricted frequency band 702 in a subframe. The MTC device 508 will then process the control region to decode PDCCH to determine what resources are allocated on PDSCH within the restricted frequency band, and then process the data buffered during PDSCH symbols within the restricted frequency band and extract the relevant higher-layer data therefrom.

Thus, referring to FIG. 7, the MTC device 508 represented in FIG. 5 buffers for each subframe the entire control region 600 (transmitted in the resources contained in the area shaded dark grey in FIG. 7) and the restricted frequency band PDSCH region 702 (transmitted in the resources contained in the area shaded light grey and black in FIG. 7), and extracts the higher-layer data allocated to the MTC device transmitted in the resources contained in the area shaded black in FIG. 7) from the restricted PDSCH regions 702 based on allocation information conveyed in the control region 600.

In one example LTE-based implementation of an embodiment of the invention each subframe is taken to comprise 14 symbols (timeslots) with PDCCH transmitted on the first three symbols and PDSCH is transmitted on the remaining 11 symbols. Furthermore, the wireless telecommunications system is taken in this example to operate over a system frequency band of 20 MHz (100 resource blocks) with a pre-established restricted frequency band of 1.4 M-Hz (six resource blocks) defined for communicating with the terminal devices operating in accordance with an embodiment of the invention.

In this case, a conventional terminal device, such as the smart phone 506 shown in FIG. 5, is required to buffer a region of 100 resource blocks (20 MHz, by 14 symbols, which is 1400 elements. However, a terminal device according to an embodiment of the invention, such as the MTC device 508 shown in FIG. 5, might only buffer the control region, which is 100 resource blocks (20 MHz) by 3 symbols, and the restricted PDSCH region, which is 6 resource blocks (1.4 MHz) by 11 symbols. Accordingly, a terminal device operating in accordance with this example embodiment of the invention buffers a total of (100×3)+(6× 11)=366 elements. This is significantly less than (by around a factor of four) the 1400 elements buffered by a conventional device. This has advantageous consequences in terms of reduced memory and processing capacity requirements, e.g. in terms of channel estimation processing, for the terminal device receiving higher-layer data only within the restricted frequency band. Consequently, terminal devices having reduced capacity as compared to the minimum requirements of a conventional terminal device can be supported in the network. Furthermore, by maintaining full system frequency band operation for the physical-layer control information (which is used by all terminal devices), a terminal device can operate in accordance with an embodiment of the invention in a wireless communication system that also supports conventional terminal devices in a manner which is transparent to the conventional terminal devices.

It will of course be appreciated that the specific numerical parameters used here are provided purely for the sake of concrete example, and other implementations of the invention may adopt other parameters, for example different bandwidths and locations for the restricted frequency band.

There are a number of different ways in which information on the restricted frequency band can be established by/shared between the base station and terminal device.

In some cases the restricted frequency band may be standardised within the wireless communications system. For example, it may be decided that any terminal device and base station which are to operate within the wireless communication system in accordance with an implementation of an embodiment of the invention should assume a restricted frequency band that has a bandwidth of 1.4 MHz and a location at the centre of the system frequency band. (Of course other parameters could be defined, for example defining lower and upper frequency limits for the standardised restricted frequency bandwidth instead of a central frequency and bandwidth). This provides a simple approach, but with limited flexibility. It will be appreciated that a restricted frequency band may be established by the base station and terminal device in various ways based on pre-defined standards. For example, rather than explicitly define the restricted frequency range, a mechanism for deriving a range may be defined in relevant standards. For example, the standards may specify that all terminal devices are to assume a given bandwidth for the restricted frequency band and to derive a location for the restricted frequency band from an identifier that is known to both the base station and the terminal device. For example, in a simple implementation terminal devices associated with an odd-numbered IMSI may assume a first location for the restricted frequency band while terminal devices associated with an even IMSI may assume a second location for the restricted frequency band. This provides for multiple restricted frequency bands to be provided based on pre-defined standards so that a greater number of reduced-capacity terminal devices may be allocated in any given subframe.

However, to improve overall scheduling flexibility it may be preferable in some implementations for the restricted frequency band to be selected by the base station and conveyed to the terminal device in advance, for example during a cell-attach procedure. The operating capabilities of the terminal device will typically set some limits on the restricted frequency band that may be used. For example a given terminal device may be unable to operate using a restricted frequency band having a bandwidth above some threshold. This may be accounted for by standardisation, for example by limiting the maximum bandwidth that may be established by the base station for the restricted frequency band, or based on the exchange of capability messages between the base station and terminal device.

A base station may, for example, be configured to communicate information regarding the restricted frequency band which is to be used for communicating with a reduced-capacity terminal device using RRC (radio resource control) signalling. Some examples of how this may be achieved are now described in the context of an LTE-based implementation of an embodiment of the invention. Here it is assumed a reduced-capacity terminal device only has capacity to buffer and process the control region and a 1.4 MHz wide restricted frequency band of the PDSCH region in each subframe it receives.

In accordance with this example embodiment it is assumed the reduced-capacity terminal device seeks to connect to a base station following broadly conventional cell-attach procedures, such as shown in FIG. 4 and discussed above. Thus, the reduced-capacity terminal device initially receives synchronisation signals and decodes PBCH using broadly conventional techniques. The terminal device is able to do this because, as shown in FIG. 3, the locations of the synchronisation signals and PBCH are defined and fixed, and furthermore they span a frequency range that the terminal device is able to buffer and process. Accordingly, the terminal device can achieve synchronisation and read PBCH using broadly conventional techniques. This allows the terminal device to derive information carried in the Master Information Block (MIB), which ultimately allows the terminal device to characterise the cell to an extent that it is able to decode PDCCH. However, to fully characterise the cell, the terminal device should also decode the system information carried in the System Information Block(s) (SIB(s)). In accordance with this example embodiment, it is assumed that one aspect of the cell characterisation carried in SIB is a definition of the restricted frequency bandwidth that is to be used by the base station. For example, a SIB may be modified to carry an indication of upper and lower frequencies for the restricted frequency band, or a central frequency and bandwidth. However, in order for the terminal device to establish the restricted frequency band to be used by the base station, the terminal device must read SIB in this example.

In a conventional LTE-based system, SIB is transmitted within the PDSCH region of each subframe on the subcarriers identified using PDCCH. Thus a conventional terminal device can simply buffer and process an entire subframe to first determine from PDCCH on which subcarriers SIB is located, and decode SIB accordingly. However, to allow a reduced-capacity terminal device that is unable to buffer and process an entire subframe to derive SIB, a pointer to the location of SIB may be provided in accordance with embodiments of the invention. There are several possible techniques for indicating the location of SIB For example, the PBCH may be modified to indicate a frequency range within which the SIB exists. PBCH contains spare bits that are not currently used and could be used to indicate the frequency range within which SIB exists. A reduced-capacity terminal device may thus determine the frequency range in which SIB is transmitted, and then buffer and process an appropriate part of the PDSCH region to read SIB.

Figure 8:
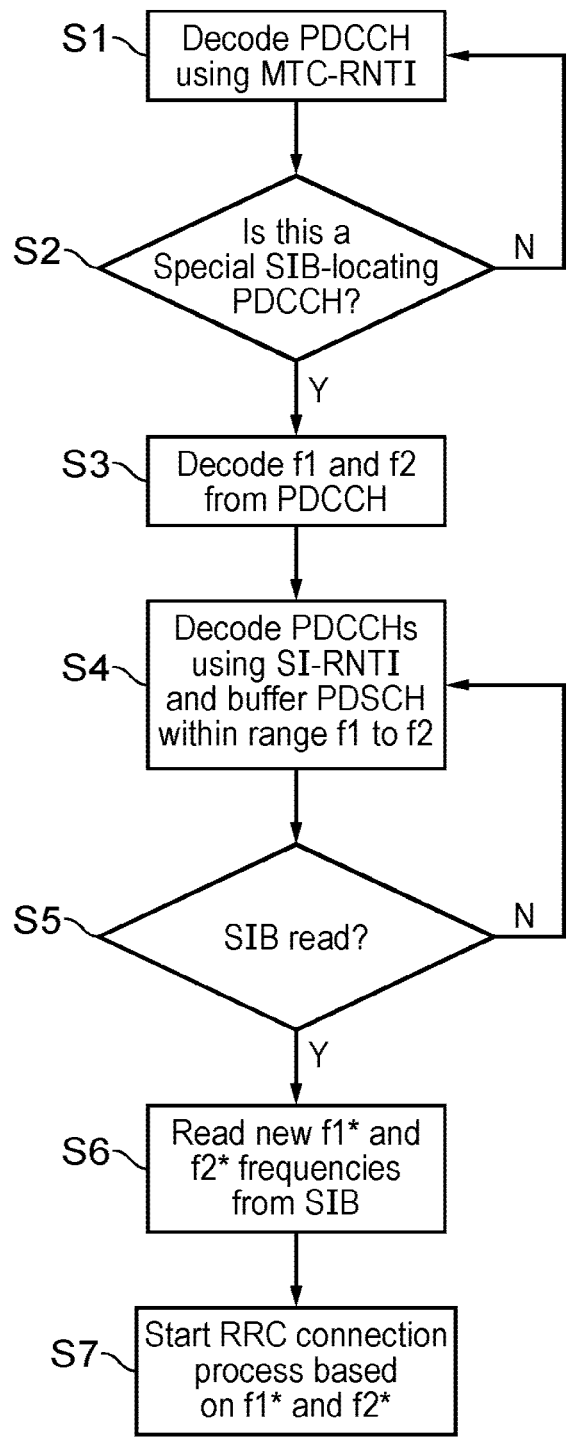
FIG. 8 is a flow diagram schematically representing a method for a terminal device operating according to an embodiment of the invention attaching to the wireless telecommunications system of FIG. 5.

Another approach would be to define a specially formatted signal within the control region (i.e. the region that contains PCFICH, PHICH and PDCCH as described above) to indicate a frequency range in which SIB resides. In accordance with established techniques, the CRC of a PDCCH signal is XOR-ed with a radio network temporary identifier (RNTI) so the PDCCH signal is only decoded (de-masked) by the terminal device, or group of terminal devices, to which the PDCCH is directed (i.e., a terminal device associated with the RNTI). Accordingly, the specially formatted signal within the control region could, for example, be a PDCCH signal whose CRC is XOR-ed with an RNTI associated with reduced-capacity terminal devices, e.g. in this example MTC devices. Such an RNTI may, for example, be referred to as an MTC-RNTI. This special PDCCH signal could, for example, indicate a "downlink resource allocation 0" message normally used to indicate which resource blocks (equivalent to frequencies) that are allocated to a terminal device associated with the relevant RNTI. However, in accordance with an embodiment of the invention, a reduced-capacity terminal device may be adapted to interpret this information as an indication of a frequency range f1 to f2 within which the SIB could exist. The terminal device could then seek to decode SIB in that frequency range. A special format PDCCH such as this might only be provided in some sub frames and not others. For example, this "SIB-locating" PDCCH signal could exist in the first subframe (subframe 0) of every frame for which the system frame number (SFN) mod 64=0. It will be appreciated that resource allocations other than "downlink resource allocation 0" could alternatively be used to convey the SIB frequency information. FIG. 8 is a flow diagram schematically representing this approach.

Thus, in step S1 of FIG. 8, a reduced-capacity terminal device seeks to decode PDCCH using an RNTI associated with the reduced-capacity terminal device (MTC-RNTI). Processing then proceeds to step S2.

In step S2 the reduced-capacity terminal device determines whether or not the PDCCH is one of a special format for "SIB-locating" (i.e whether or not it can be decoded using the MTC-RNTI to derive a "downlink resource allocation 0" message). If the terminal device determines the PDCCH is not "SIB-locating", processing follows the branch marked "N" back to step S1 where the terminal device seeks to decode a subsequent PDCCH. However, if the terminal device determines the PDCCH is "SIB-locating", processing follows the branch marked "Y" to step S3.

In step S3 the terminal device derives an indication of the frequency within which SIB is to be found from the decoded "SIB-locating" PDCCH message. Thus the terminal device determines from this message the frequency range in which SIB may be present in future subframes. Processing then proceeds to step S4.

In step S4 the terminal device buffers the control region and a region of PDSCH corresponding to the frequency range f1 to f2 determined in step S3. The terminal device then proceeds to decode PDCCH using conventional techniques for determining the subcarriers on which SIB is carried (i.e. using SI-RNTI) and acquires SIB from the buffered PDSCH region. Thus the terminal device "knows" from step S3 that the subcarriers carrying SIB will be somewhere in the frequency range f1 to f2, and in step S4 the terminal device determines the actual set of subcarriers within the range of frequencies f1 to f2 which is used to carry SIB in the subframe. Processing then proceeds to step S5.

In step S5 the reduced-capacity terminal device determines whether or not SIB has been successfully acquired in step S4. If SIB is not acquired processing follows the branch marked "N" back to step S4 where the terminal device seeks to decode a subsequent PDCCH. However, if the terminal device determines SIB had been acquired, processing follows the branch marked "Y" to step S6.

In step S6 the terminal device derives restricted frequency band information (for example upper and lower frequencies f1* and f2*) from SIB. The exact manner in which the restricted frequency band information is carried by SIB will depend on the implementation at hand. Processing then proceeds to step S7 where the radio resource control connection process may proceed. The restricted frequency band information defined by the upper and lower frequencies f1* and f2* communicated by SIB in this way may be used to define the restricted frequency band for subsequent higher-layer data communication as described above, or may be used simply to define a restricted frequency band for subsequent RRC connection signalling, with a replacement restricted frequency band for higher-layer data communication being defined by the subsequent RRC connection signalling.

Another mechanism for ensuring a reduced-capacity terminal device according to an embodiment of the invention can acquire SIB is for the location of SIB to be specified in an amended 3GPP specification (standard). For example, the relevant specifications could be amended to indicate a location of the first block of the SIB (SIB1). The locations of subsequent blocks of SIB (SIB2, SIB3, SIB4 . . . , etc.) need not be standardised, because the locations for these SIBs can be provided in a previous SIB. For example, the first SIB block (in a standardised location) could indicate to terminal devices where future SIB blocks reside. For example SIB1 could be in a known location in the frequency space and the frequency range f1 to f2 in which SIB2 to SIB11 reside could be signalled in SIB1.

Another mechanism for ensuring a reduced-capacity terminal device according to an embodiment of the invention can acquire SIB is by constraining SIB (e.g. in standard specifications) to always occur at the same location from frame-to-frame, but without specifying any particular location. If, for example, the SIB is repeated every 64 frames, a terminal device could derive the location of the SIB using the PDCCH in frame 0. The terminal device would not be able to decode the SIB in frame 0 because the terminal device would not have known in advance within which frequencies f1 and f2 the SIB resides, and so would not have been able to buffer the necessary frequency range (unless by coincidence). However, based on the SIB location derived from PDCCH in sub frame 0, and assuming SIB is constrained to be located in the same frequency range in frame 64, the terminal device could butter the appropriate frequencies in frame 64 to acquire SIB.

Once SIB has been acquired by the reduced capacity terminal device using any of the above described techniques, the terminal device is able to derive the restricted frequency band that will be used by the base station for further communications since this can readily be communicated by SIB according to any pre-arranged technique. Thus the terminal device is aware of what frequency ranges will be used for RRC connection signalling for reduced capacity terminal devices. For example, the range may be defined as spanning frequencies f1* to f2*.

The terminal device may then proceed to connect to the network supported by the base station using the PRACH (physical random access channel). The terminal device can be configured to listen for a "random access response" only within the frequency range f1* to f2*, and the base station (eNode B) can correspondingly be configured to send random access response messages to reduced-capacity terminal devices only in this frequency range.

The reduced capacity terminal device may then complete its RRC connection process in a broadly conventional manner, except for only listening (i.e. buffering data) for responses from the network in the f1* to f2* frequency range, the base station being configured to only respond in this range. In accordance with conventional RRC connection procedures the terminal device will receive a "radio bearer setup" message. This message may be adapted to indicate a new frequency range, f1# to f2#, to be used by the base station as the restricted frequency band on which higher-layer data is to be communicated. The restricted frequency band f1# to f2# might be terminal-device specific or could be applicable to a plurality of terminal devices (e.g. a group of UEs) depending on the implementation at hand.

At this stage the reduced-capacity terminal device is aware of the restricted frequency band that the base station will be using to communicate higher-layer data to the terminal device. Accordingly, the terminal device can proceed with buffering PDCCH and the restricted frequency band of PDSCH, and the base station can proceed with only allocating the terminal device with downlink resources on PDSCH within the restricted frequency band, so that higher-layer data may be communicated from the base station to the terminal device in the manner described above, for example with reference to FIG. 7.

While a connection is ongoing, the frequency range f1# to f2# could be modified for a given terminal device (i.e. the range of frequencies that the terminal device should buffer for decoding could be changed during the lifetime of the connection). A change in the restricted frequency band f1# to f2# could be signalled using RRC signalling or MAC signalling. For example, replacement values for f1# and f2# could be encoded in a MAC header of PDUs transmitted to a terminal device during an ongoing connection.

In order for a reduced-capacity terminal device to remain pageable when in RRC idle mode, the terminal device may configure itself to buffer an appropriate part of the downlink frames having regard to where paging messages are transmitted. The base station may have previously signalled the appropriate portion of the downlink subframes where paging messages may be located. The terminal device may have been signalled this information, for example, by system information or other RRC signalling. What is more, in some examples, a paging message may be modified to include an indication of the restricted frequency band to be used for subsequent paging messages/communications.

It will be appreciated that various modifications can be made to the embodiments described above without departing from the scope of the present invention as defined in the appended claims.

For example, in the specific examples described above information identifying the restricted frequency band is defined by standardisation, or communicated from the base station to the reduced capacity terminal device. However, in principle a reduced capacity terminal device may be configured to determine the restricted frequency band it wishes to use, and communicate this to the base station. For example, an indication of a terminal device's chosen restricted frequency band may be conveyed in a random access channel access (RACH) by selection of an appropriate preamble in accordance with a predefined scheme for mapping selected preambles to restricted frequency bands. However, in general it will be most appropriate for the base station to determine the restricted frequency band since the base station can more easily take account of other terminal devices operating in the cell and select an appropriate restricted frequency band for a given terminal device accordingly.

Furthermore, while the above embodiments have primarily focused on defining a restricted frequency band in which resource allocations for reduced-capacity terminal devices are provided such that the terminal devices need not buffer the entire subframe, the same principle could also be applied in the time domain. That is to say, some embodiments of the invention may be based on pre-establishing a restricted number of symbols (timeslots) within which higher-layer data, e.g. on PDSCH in LTE, may be communicated from a base station to a reduced-capacity terminal device, wherein the restricted number of symbols is fewer than the number of symbols allocated for higher-layer data for conventional ("full-capacity") terminal devices. Thus a base station may be configured to only allocate downlink resources for a terminal device on PDSCH within a restricted number of PDSCH symbols. Because the terminal device knows in advance that it will only be allocated PDSCH resources within the restricted number of symbols, the terminal device does not need to buffer and process any PDSCH resources from other symbols. This principle is shown in FIG. 9.

Figure 9:
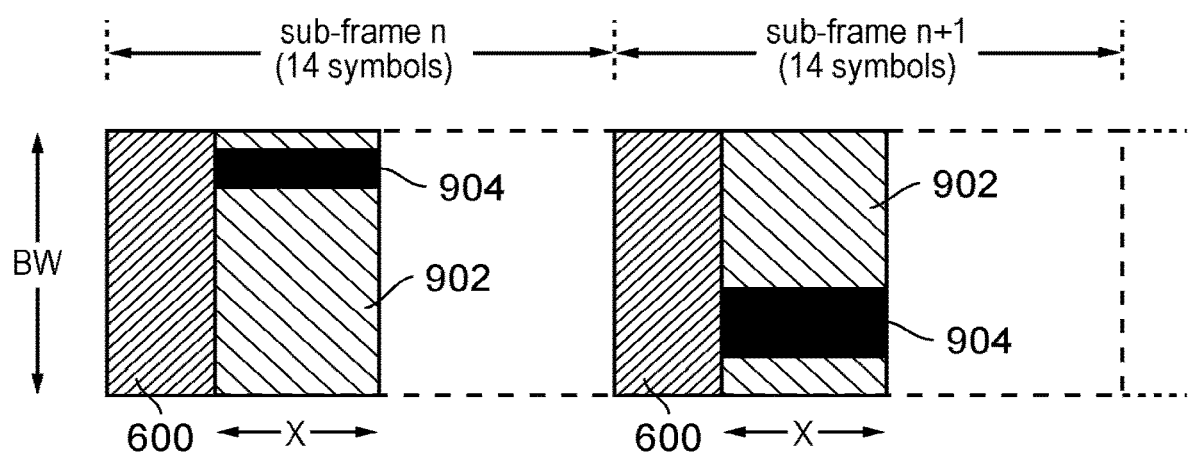
FIG. 9 schematically represents two arbitrary downlink subframes as seen by a terminal device operating according to another embodiment of the invention in a wireless telecommunications system according to an embodiment of the invention.

FIG. 9 schematically represents two arbitrary downlink subframes (identified as subframe n and subframe n+1) as seen by a reduced-capacity terminal device according to an embodiment of the invention. FIG. 9 is in some respects similar to FIGS. 6 and 7, and aspects of FIG. 9 which correspond to aspects of FIGS. 6 and 7 are not described again in detail.

In this example it is assumed a base station and a reduced-capacity terminal device have both established that higher-layer data is to be communicated from the base station to the terminal device only within a restricted number of OFDM symbols (X) in each subframe. In this example the restricted number of symbols immediately follow the control region, but that need not necessarily be the case. For the sake of a concrete example, the restricted number of symbols is assumed here to be 4. Information on the restricted number of symbols can be established shared between the base station and terminal device using the same principles as described above for establishing/sharing the restricted frequency band information.

FIG. 9 represents in shading the areas of each subframe which the reduced-capacity terminal device is arranged to buffer ready for processing. The buffered part of each subframe comprises a control region 600 supporting conventional physical-layer control information, such as the PCFICH, PHICH and PDCCH channels as discussed above and a restricted PDSCH region 902. The physical-layer control regions 600 that are buffered by the reduced-capacity terminal device are the same as the physical-layer control regions 600 buffered by the smart phone device 506 as represented in FIG. 6. However, the PDSCH regions 902 carrying higher-layer data which are buffered by the reduced-capacity terminal device are smaller than the PDSCH regions 602 buffered by the smart phone device 506 as represented in FIG. 6. This is possible because, as noted above, in accordance with embodiments of the invention, a base station may be adapted so that higher-layer data on PDSCH is allocated to reduced-capacity terminal devices only on symbols within the pre-established restricted number of symbols X. Because the terminal device "knows" this, the terminal device can be configured to ignore (i.e. not buffer) PDSCH resources that are outside the restricted number of symbols X.

Also schematically shown in FIG. 9 by black shading are example PDSCH downlink allocations 904 for the reduced-capacity terminal device. The reduced-capacity terminal device may be configured to derive its specific PDSCH downlink allocations for each subframe from PDCCH transmitted in the control region 600 of the subframe in accordance with the defined standards. That is to say, the principles for communicating to the reduced-capacity terminal device the downlink allocations 904 it has been allocated does not need modifying to implement an embodiment of the invention (the terminal device simply operates on the understanding that higher-layer data will only be transmitted on the allocated subcarriers for the restricted number of symbols).

Thus, a reduced-capacity terminal device may buffer for each subframe the entire control region 600 (shaded dark grey in FIG. 9) and the restricted PDSCH region 902 (shaded light grey and black in FIG. 9) and extract the higher-layer data allocated to the reduced-capacity terminal device shaded black in FIG. 9) from the restricted PDSCH regions 902 based on allocation information conveyed in the control region 600.

In one example LTE-based implementation of an embodiment of the invention, each subframe is taken to comprise 14 symbols (timeslots) with PDCCH transmitted on the first three symbols and PDSCH is transmitted on the remaining 11 symbols. Furthermore, the wireless telecommunications system is taken in this example to operate over a system frequency band of 20 MHz (100 resource blocks) with a pre-established restricted number of symbols of 4 used for communicating with reduced-capacity terminal devices operating in accordance with an embodiment of the invention.

In this case, and as already discussed above, a conventional terminal device, such as the smart phone 506 shown in FIG. 5, is required to buffer a region of 100 resource blocks (20 MHz) by 14 symbols, which is 1400 elements. However, a reduced-capacity terminal device according to this embodiment of the invention might only buffer the control region, which is 100 resource blocks (20 MHz) by 3 symbols, and the restricted PDSCH region, which is 100 resource blocks (20 MHz) by 4 symbols. Accordingly, a terminal device operating in accordance with this example embodiment of the invention need only buffer a total of (100×3)+(100×4)=700 elements. This is significantly less than (by around a factor of two) the 1400 elements buffered by a conventional device. As with the restricted frequency band embodiments described above this has advantageous consequences in terms of reduced memory and processing capacity requirements for the terminal device receiving higher-layer data only on the restricted number of symbols.

In general, it is expected the restricted frequency-based embodiments may be preferred in some implementations because they do not "waste" resources. This is because all of the PDSCH resources outside the restricted frequency band can be allocated for use by conventional terminal devices. However, in an example embodiment using a restricted number of symbols, it is less easy for the transmission resources outside the restricted number of symbols on subcarriers allocated to reduced-capacity terminal devices to be re-used by conventional terminal devices (although they could be allocated to other reduced-capacity terminal devices adapted to buffer only a subset of the available symbols supporting PDSCH). Furthermore, a restricted frequency-based approach may simplify other aspects of the implementation. For example, a conventional SIB extends across all available symbols and so an approach in which a reduced capacity device is able to only buffer a reduced number of symbols may rely on further modifications, for example, a dedicated SIB spanning a reduced number of symbols may be defined to convey the relevant information to reduced capacity devices.

It will be appreciated that other embodiments of the invention may combine aspects of a restricted frequency band and a restricted number of symbols.

What is more, although embodiments of the invention have been described with reference to an LTE mobile radio network, it will be appreciated that the present invention can be applied to other forms of network such as GSM, 3G/UMTS, CDMA2000, etc.

Thus, a method for communicating data between a base station and a terminal device in a wireless telecommunications system has been described, for example an LTE-based system. The wireless communication system uses a plurality of frequency sub-carriers spanning a system frequency band. Physical-layer control information for the terminal device is transmitted from the base station using sub-carriers selected from across the system frequency band, for example to provide frequency diversity. However, higher-layer data for the terminal device is transmitted using only sub-carriers selected from within a restricted frequency band which is smaller than and within the system frequency band. The terminal device is aware of the restricted frequency band, and as such need only buffer and process data within this restricted frequency band during periods where higher-layer data is being transmitted. The terminal device buffers and processes the fill system frequency band during periods when physical-layer control information is being transmitted. Thus, a terminal device may be incorporated in a network in which physical-layer control information is transmitted over a wide frequency range, but only needs to have sufficient memory and processing capacity to process a smaller range of frequencies for the higher-layer data.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] ETSI TS 122 368 V10.530 (2011 July)/3GPP TS 22.368 version 10.5.0 Release 10)
[2] UK patent application GB 1101970.0
[3] UK patent application GB 1101981.7
[4] UK patent application GB 1101966.8
[5] UK patent application GB 1101983.3
[6] UK patent application GB 1101853.8
[7] UK patent application GB 1101982.5
[8] UK patent application GB 1101980.9
[9] UK patent application GB 1101972.6
[10] R1-113113. Pantech USA, 3GPP TSG-RAN WG1 #66bis meeting, Zhuhai, China, 10 Oct. 2011 to 14 Oct. 2011
[11] Holma H. and Toskala A. "*LTE for UMTS OFDMA and SC-FDMA based radio access*". John Wiley and Sons, 2009

The invention claimed is:

1. An electronic device configured to receive data in a wireless telecommunications system, the electronic device comprising:
   circuitry configured to
      receive an indication of a restricted frequency band in Radio Resource Control (RRC) signaling;
      receive physical-layer control information using a first group of a plurality of subcarriers within a first system frequency bandwidth, wherein the restricted frequency band is smaller than and within the first system frequency bandwidth;
      receive higher-layer data in subcarriers spanning the restricted frequency band;
      process the physical-layer control information to determine an allocation of higher-layer data for the terminal device within the restricted frequency band; and
      process the higher-layer data to extract the allocated higher-layer data for the terminal device from the restricted frequency band.

2. The electronic device of claim 1, wherein the indication of the restricted frequency band is received during a connection establishment procedure in which a connection is established between the electronic device and a base station.

3. The electronic device of claim 1, wherein the indication of the restricted frequency band is received using a radio resource that is defined by a standard of the wireless telecommunications system.

4. The electronic device of claim 1, wherein the circuitry is configured to receive an indication of a radio resource to be used for receiving the indication of the restricted frequency band.

5. The electronic device of claim 4, wherein the indication of the radio resource is received during a connection establishment procedure in which a connection is established between the electronic device and a base station.

6. The electronic device of claim 4, wherein the indication of the radio resource is received in a Master Information Block (MIB) of the wireless telecommunications system.

7. The electronic device of claim 4, wherein the indication of the radio resource is received using a physical broadcast channel of the wireless telecommunications system.

8. The electronic device of claim 4, wherein the indication of the radio resource is received as physical-layer control information having a format selected by a base station to provide the indication of the radio resource.

9. The electronic device of claim 1, wherein the physical-layer control information is received on a physical downlink control channel of the wireless telecommunications system.

10. The electronic device of claim 9, wherein the physical-layer control information of a pre-defined format is received on the physical downlink control channel of the wireless telecommunications system.

11. The electronic device of claim 1, wherein the higher-layer data is received on a physical downlink shared channel of the wireless telecommunications system.

12. The electronic device of claim 1, wherein the indication of the restricted frequency bandwidth is communicated in association with a System Information Block (SIB) of the wireless telecommunications system.

13. The electronic device of claim 1, wherein the physical-layer control information comprises an indication of transmission resource allocations for the higher-layer data.

14. The method of claim 1, wherein the physical-layer control information comprises an indication of transmission resource allocations for the higher-layer data.

15. A method performed by electronic device configured to receive data in a wireless telecommunications, the method comprising:
   receiving an indication of a restricted frequency band in Radio Resource Control (RRC) signaling;
   receiving physical-layer control information using a first group of a plurality of subcarriers within a first system frequency bandwidth, wherein the restricted frequency band is smaller than and within the first system frequency bandwidth;
   receiving higher-layer data on subcarriers spanning the restricted frequency band;
   processing the physical-layer control information to determine an allocation of higher-layer data for the terminal device within the restricted frequency band; and
   processing the higher-layer data to extract the allocated higher-layer data for the terminal device from the restricted frequency band.

16. The method of claim 15, wherein the indication of the restricted frequency band is received during a connection establishment procedure in which a connection is established between the electronic device and a base station.

17. The method of claim 15, wherein the indication of the restricted frequency band is received using a radio resource that is defined by a standard of the wireless telecommunications system.

18. The method of claim 15, further comprising:
   receiving an indication of a radio resource to be used for receiving the indication of the restricted frequency band.

19. The method of claim 18, wherein
the indication of the radio resource is received in a Master Information Block (MIB) of the wireless telecommunications system.

20. The method of claim 18, wherein
the indication of the radio resource is received using a physical broadcast channel of the wireless telecommunications system.

21. The method of claim 18, wherein
the indication of the radio resource is received as physical-layer control information having a format selected by a base station to provide the indication of the radio resource.

22. The method of claim 18, wherein
the indication of the radio resource is received during a connection establishment procedure in which a connection is established between the electronic device and a base station.

23. The method of claim 15, wherein
the physical-layer control information is received on a physical downlink control channel of the wireless telecommunications system.

24. The method of claim 23, wherein
the physical-layer control information of a pre-defined format is received on the physical downlink control channel of the wireless telecommunications system.

25. The method of claim 15, wherein
the higher-layer data is received on a physical downlink shared channel of the wireless telecommunications system.

26. The method of claim 15, wherein
the indication of the restricted frequency bandwidth is communicated in association with a System Information Block (SIB) of the wireless telecommunications system.

27. A mobile terminal for communicating data in a wireless telecommunications system, wherein the mobile terminal is configured to:
receive physical-layer control information received using a first group of symbols within a first system frequency bandwidth;
receive higher-layer data received using a second group of the symbols spanning a second system frequency bandwidth, wherein the number of the symbols in the second group is less than the number of the symbols available for transmitting higher-layer data to other terminal devices, and the second system frequency bandwidth is smaller than and within the first system frequency bandwidth;
process the physical-layer control information to determine an allocation of higher-layer data for the terminal device within the second group of the symbols; and
process the higher-layer data to extract the allocated higher-layer data for the terminal device from the second group of the symbols.

28. The mobile terminal of claim 27, wherein
the physical-layer control information is received on a physical downlink control channel of the wireless telecommunications system, and
the higher-layer data is received on a physical downlink shared channel of the wireless telecommunications system.

29. A method performed by a mobile terminal for communicating data in a wireless telecommunications system, wherein the method comprises:
receiving physical-layer control information received using a first group of a symbols within a first system frequency bandwidth;
receiving higher-layer data received using a second group of the symbols spanning a second system frequency bandwidth, wherein the number of the symbols in the second group is less than the number of the symbols available for transmitting higher-layer data to other terminal devices, and the second system frequency bandwidth is smaller than and within the first system frequency bandwidth;
processing the physical-layer control information to determine an allocation of higher-layer data for the terminal device within the second group of the symbols; and
processing the higher-layer data to extract the allocated higher-layer data for the terminal device from the second group of the symbols.

* * * * *